United States Patent
Rafsky et al.

(10) Patent No.: US 9,313,149 B2
(45) Date of Patent: Apr. 12, 2016

(54) METHOD AND SYSTEM TRACKING AND DETERMINING PUBLIC SENTIMENT RELATING TO SOCIAL MEDIA

(71) Applicant: Acquire Media Ventures Inc., Roseland, NJ (US)

(72) Inventors: Lawrence C. Rafsky, Livingston, NJ (US); Robert E. Ungar, Randolph, NJ (US); Thomas B. Donchez, Bethlehem, PA (US); Jonathan A. Marshall, Montclair, NJ (US); Carolina Tejada, Union City, NJ (US)

(73) Assignee: ACQUIRE MEDIA VENTURES INC., Roseland, NJ (US)

( * ) Notice: Subject to any disclaimer, the term of this patent is extended or adjusted under 35 U.S.C. 154(b) by 190 days.

(21) Appl. No.: 13/939,671

(22) Filed: Jul. 11, 2013

(65) Prior Publication Data
US 2014/0019548 A1    Jan. 16, 2014

Related U.S. Application Data

(60) Provisional application No. 61/670,342, filed on Jul. 11, 2012.

(51) Int. Cl.
| | | |
|---|---|---|
| H04L 29/04 | (2006.01) | |
| H04L 12/58 | (2006.01) | |
| G06Q 50/00 | (2012.01) | |
| G06Q 10/10 | (2012.01) | |

(52) U.S. Cl.
CPC ............. *H04L 51/00* (2013.01); *G06Q 10/10* (2013.01); *G06Q 50/01* (2013.01)

(58) Field of Classification Search
CPC .... H04L 67/22; G06Q 30/02; G06Q 30/0244; G06Q 30/0246; H04N 21/252; H04N 21/44222; H04N 21/6582
See application file for complete search history.

(56) References Cited

U.S. PATENT DOCUMENTS

| | | | |
|---|---|---|---|
| 9,117,227 B1 * | 8/2015 | Agrawal et al. | |
| 2012/0131139 A1 * | 5/2012 | Siripurapu et al. | 709/217 |
| 2012/0136714 A1 * | 5/2012 | Nesamoney et al. | 705/14.43 |
| 2013/0091147 A1 * | 4/2013 | Kim et al. | 707/748 |
| 2013/0262653 A1 * | 10/2013 | Qu et al. | 709/224 |
| 2013/0339523 A1 * | 12/2013 | Lopatecki et al. | 709/224 |
| 2014/0006142 A1 * | 1/2014 | Gaudet et al. | 705/14.45 |

* cited by examiner

*Primary Examiner* — Barbara Burgess
(74) *Attorney, Agent, or Firm* — Lowenstein Sandler LLP

(57) ABSTRACT

A method for determining influential broadcast messages in which a processing device identifies a plurality of re-posts of a post, wherein each re-post comprises a time stamp, determines whether the time stamp of the re-post is within a first time interval or a second time interval, increments a first count associated with the first time interval when the time stamp is within the first time interval or a second count associated with the second time interval when the time stamp is within the second time interval, and determines a public sentiment attribute associated with the post in view of a comparison between the first count and the second count.

17 Claims, 4 Drawing Sheets

|     | Post ID | Post content | Initial Post Time | Interval 1 Count | Interval 2 Count | Classification |
| --- | --- | --- | --- | --- | --- | --- |
| 302 | | | | | | |
| 304 | 0 | Company A invent | Aug 31, 2013 14:09:19 | 2 | 4 | Growing |
| 306 | 1 | Brand B computer | Sept 14, 2013 10:30:28 | 5 | 1 | Not interesting |
| 308 | 2 | Brand C automobile | July 28, 2013 21:46:38 | 12 | 37 | Substantially Growing |
| 310 | 3 | Company D IPO | Nov 21, 2013 03:11:04 | 2,000,000 | 1,999,999 | High |
| 312 | 4 | Company E Bankrupt | Dec 3, 2013 23:33:57 | 100 | 38 | Not interesting |

Figure 3

METHOD AND SYSTEM TRACKING AND DETERMINING PUBLIC SENTIMENT RELATING TO SOCIAL MEDIA

CROSS-REFERENCE TO RELATED APPLICATION

This application claims the benefit of U.S. Provisional Patent Application No. 61/670,342 filed Jul. 11, 2012, the disclosure of which is incorporated herein by reference in its entirety.

TECHNICAL FIELD

This disclosure generally relates to analyzing content on the World Wide Web to track and determine public sentiment relating to social media. More specifically, this disclosure uses a statistical approach to track and analyze user-submitted content (posts and re-posts) on the Web and to determine the respective public sentiment of that content.

BACKGROUND

The World Wide Web or Internet is a global resource with an abundance of content and information created by people across the globe, herein referred to as "users". User submitted content can be found on several different social media platforms, Web sites, social media networks, and other Web sources that are publicly available on the Web. Examples of particular social media platforms, which provide a mechanism for users to submit content, include Twitter™, Facebook™, and Pinterest™, which are examples of micro-blog, content, and image sharing platforms. Users of such social media platforms can post a message, micro-blog message, or image, herein referred to as a "post" for others to read, view, respond to, and share. For example, the Twitter™ social media platform currently supports more than 100 million users and over 400 million posts (i.e., Tweets) per day. With such social media platforms containing such a vast amount of user-generated content, data from a social media platform can be a valuable resource for determining public sentiment relating to various issues, topics, people, or companies.

Many people are interested in analyzing such social media content available on the Web, particularly content created by user activity on social media sites, such as, for example, Twitter™, Facebook™, and Pinterest™. One particular example of a set of users who may be interested in such analysis is stock market traders, who generally have an interest in the public sentiment of companies or other financially impactful information. Many solutions are currently available to monitor online content, such as basic Web aggregation software, but these solutions fail to measure the real time public sentiment of social media users. For example, a search can be performed using key words that analysts are interested in, creating a simple count of key word mentions on social media platforms. The amount of mentions can provide a basic measurement of interest, and a large number of key word mentions can determine a high interest in a topic, but there is little context for this amount in regards to time or rate of increase. While this known approach has been conducted in prior art and is commonly used today, modern social media sites provide more mechanisms for sharing information. Social media sites often provide a mechanism to re-post content from users, or to copy and republish the same content that interests them. For example, Twitter™ provides a mechanism to re-post user-submitted content through a mechanism coined as a "Retweet". A Retweet is created by a Tweet that has been posted on the social media platform Twitter™. The Tweet can then be read by another Twitter™ user, who can then re-post the Tweet based on the user's interest in the Tweet. In other words, the same short message that has been posted by a user can be re-posted by a different user, which is called a Retweet. Retweets can continue to be re-posted by additional users to create an expanding content base of Retweets of the same message.

In another example, Facebook™ provides a mechanism to re-post the user-submitted content through a mechanism coined a "Like". A Like creates a connection between the posted content on the social networking site Facebook™ and a different user who likes or affirms a person's posted content. In another example, Pinterest™ provides a mechanism to re-post the user-submitted content through a mechanism coined a "Re-pin". Users can browse others posts for images and "Re-pin" images to their own account.

Simply mentioning a specific area of interest does not provide sufficient information to fully articulate public perception of a topic. For example, a user can mention a certain word such as "Factories" in a message, and several users can mention the same word "Factories", but counting how many times the word factories is mentioned will not provide information greater than the information present at hand (e.g., factories mentioned X number of times).

Accordingly, what would be desirable is a method that can determine the public sentiment attribute of a post. Moreover, due to the widespread use of social networking sites such as, for example, Twitter™, Facebook™, and Pinterest™, the public sentiment of issues, a company, or any other area of interests may be measured using the methods described herein.

While simply counting the number of posts containing significant key words would provide some measure of public sentiment, what would be desirable is a method that provides a more complex measure of the growth and expansion of re-posts of a message or an image.

SUMMARY

Presented herein is a method to track and determine a public sentiment attribute relating to social media, to neglect irrelevant data, and to create a method for measuring an expansion rate of re-posts to determine a public sentiment about an original post.

BRIEF DESCRIPTION OF THE DRAWINGS

The present disclosure may be more readily understood from the detailed description of an exemplary embodiment presented below considered in conjunction with the attached drawings and in which like reference numerals refer to similar elements, and in which:

FIG. 3 is an example of a data table illustrating one embodiment of a method for tracking and determining a public sentiment attribute relating to a social media post.

Figure 1A:
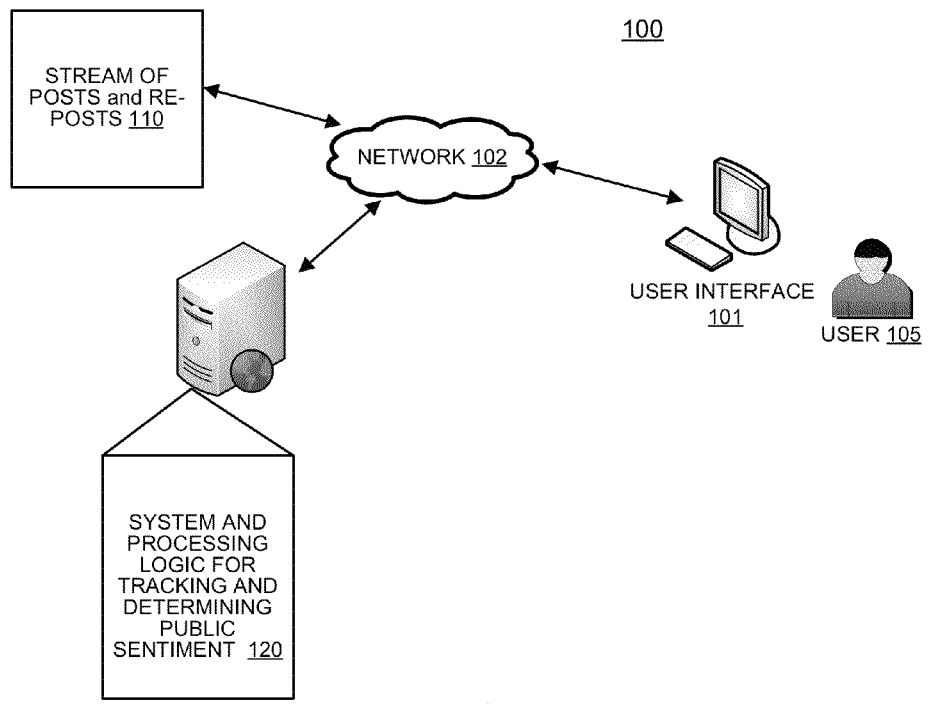
FIG. 1A is a block diagram of one embodiment of an environment for tracking and determining a public sentiment attribute relating to a social media post.

It is to be understood that the attached drawings are for purposes of illustrating the concepts of the disclosure and may not be to scale.

DETAILED DESCRIPTION

The present disclosure provides a method and system for individual client or server machines to collect user-generated Web content and to calculate public perception of a post based on re-posts. Using the aggregated Web content from social media platforms, for example, Twitter™ and its Retweeting feature, or Facebook™ and its Like feature, or Pinterest™ and its Re-pin feature, the present disclosure describes an algorithm further described herein that calculates the rate of expansion of re-posted messages (e.g., Retweets, Likes, or Re-pins, etc.). A re-post expansion rate is measured to determine the significance of the subject matter and public interest in the original post. In an example, the disclosure includes a method which may be referred to as the Velocity Of ReTweet Expansion, or VORTEX.

As used herein, the term "post" is intended to include any type communication including a short entry text message, an audio message, a message content, a broadcast message, an image, a video, or combination thereof that may be displayed by a user on a social media account (e.g., a Tweet on the Twitter™ platform, a pin on the Pinterest™ platform, a status update, comment, photo, audio playback, or advertisement on the Facebook™ platform, and the like) for other users to consume (e.g., read, view, respond to, and/or share). As used herein, the term "re-post" is intended to include a replication or reference to an affirmation of the post. Examples of a re-post include, but are not limited to, a republishing of a short message that has previously been posted (e.g., a "Retweet" on the Twitter™ platform), an affirmation of a message (e.g., a "Like" on the Facebook™ platform), and a republishing of an image that has previously been posted (e.g., a "Re-pin" on the Pinterest™ platform). It is to be understood that the above described social media platforms have been made in an illustrative fashion, and not a restrictive one, and that any post and re-post may be tracked and analyzed.

According to an embodiment, the present disclosure can be implemented as part of a computer program, application, computer-executable instructions, or software package. As used herein, the term "program", "application", "software package", "processing logic", or "computer executable instructions" refers to instructions that may be performed by a processor and/or other suitable components. The term "computer" or "server", as used herein, is not limited to any one particular type of hardware device, but may be any data processing device such as a desktop computer, a laptop computer, a kiosk terminal, a personal digital assistant (PDA) or any equivalents or combinations thereof. Any device or part of a device configured to process, manage or transmit data, whether implemented with electrical, magnetic, optical, biological components or otherwise, may be made suitable for implementing the disclosure described herein.

As used herein, the term "communicatively connected" is intended to include any type of connection, whether wired or wireless, in which data may be communicated. Furthermore, the term "communicatively connected" is intended to include a connection between devices and/or programs within a single computer or between devices and/or programs on separate computers.

FIG. 1A is a diagram of one embodiment of an environment 100 for tracking and determining a public sentiment attribute relating to a social media post.

In one embodiment, the environment 100 includes a network 102 (e.g., Internet, World Wide Web, etc.), which may be any type of communications medium that allows for tracking and determining public sentiment relating to social media between the user interface 101, the posts and re-posts 110, and the system and processing logic for tracking and determining public sentiment 120 ("the determining system 120"). In an example, the system, or portion thereof, may be referred to as VORTEX.

The determining system 120 includes a computing device such as a server and processing logic for tracking and determining public sentiment relating to social media. The determining system 120 can be a desktop computer, a laptop computer, a dedicated server computer, a console device, a network device, or a similar computing device. As used herein, "public sentiment" refers to an aggregate of individual attitudes or beliefs about a certain topic. As used herein, "public sentiment attribute" refers to, for example, an attribute or a label that may be associated with the post which describes a public sentiment about the post. As used herein, "social media" refers to a means for network or Internet-based interactions among people in which they can create, share, and exchange information and ideas. In an embodiment, the determining system 120 can operate as a stand-alone system as shown in FIG. 1A. In another embodiment, the determining system 120 can be integrated with the user interface 101 (not shown). In another embodiment, the determining system 120 can be integrated with the social media platform (not shown).

The environment 100 includes a user interface 101, which may be any device capable of enabling a user 105 to communicate with the determining system 110 via the network 102, including, but not limited to a computer, a smart phone, a wireless device, a tablet, and/or any suitable computing device. In an embodiment, the user interface 101 may be a mobile device (e.g., a handheld device, smart phone or web portal device) that communicates with the network 102 via a wireless connection. As used herein, the term "user" is intended to include an individual person, a group of people, a corporate entity, or the like, who is interested in tracking and determining public sentiment relating to social media.

The environment 100 includes a stream of posts and re-posts 110. The stream of posts and re-posts 110 may be received or identified from a feed from the social media platform, Web aggregation, an Application Programming Interface (API), or any other method available for retrieving content over the network 102 or Internet. In an embodiment, the stream of posts and re-posts 110 can be analyzed by the determining system 120.

Figure 1B:
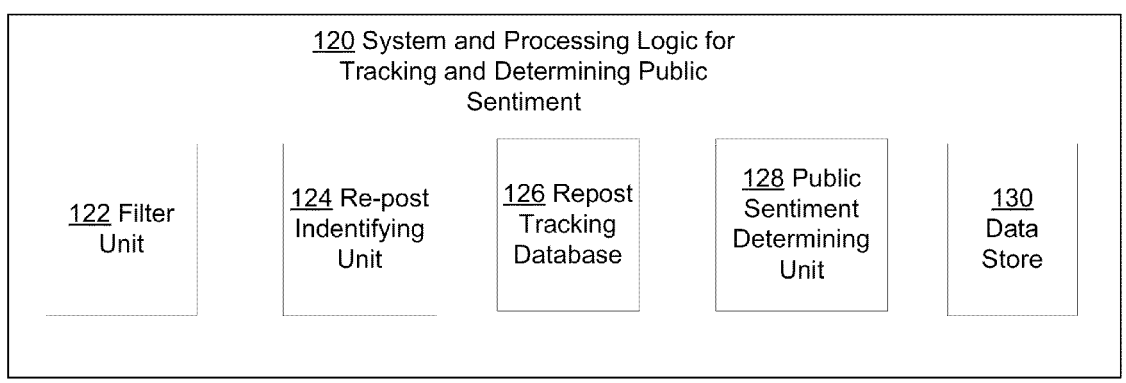
FIG. 1B is a block diagram of one embodiment of a subsystem for tracking and determining a public sentiment attribute relating to a social media post.

FIG. 1B is a block diagram of one embodiment of the determining system for tracking and determining public sentiment relating to social media. In an embodiment, the determining system 120 may include units for tracking and a public sentiment attribute relating to a social media post as illustrated in FIG. 1B. The determining system 120 can include a filter unit 122, a re-post identifying unit 124, a re-post tracking unit 126, a public sentiment determining unit 128, and a data store 130.

In an embodiment, the filter unit 122 may analyze the stream of posts and re-posts 110 for tracking and determining public sentiment relating to social media. A certain key word or a combination of key words and/or unique identifiers (e.g., a company identifier) can be provided to the filter unit 122 for capturing relevant data. The key word, the combination of key words, and/or the company identifiers can be selected to create a search service for a specific company or area of interest. For instance, to find information about a company like Google™, a key word of "Google" can be used, or alternatively stock symbol "GOOG" can be used. A list of the key words, key word combinations, and unique company identifiers can be maintained by the determining system 120. When the key word, key word combinations, and/or unique company identifiers is mentioned in a content, a post, or a re-post in a particular social media platform such as Twitter™, the particular social media platform can be linked to this list and the post or re-post can be collected and analyzed by the determining system 120.

In an embodiment, the filter unit 122 may remove irrelevant content based on key word, key word combinations, and/or unique company identifiers. The filter unit 122 can filter incoming content (e.g., stream of posts and re-posts 110) using a variety of string matching techniques, including but not limited to regular expressions or string matching libraries used in programming. Incoming content that matches a key word using one of these methods can be passed to the content identifying unit 124 for further identification. The filter unit 122 can discard or ignore incoming content that does not match the key word.

In an embodiment, the content (stream of posts and re-posts 110) can be passed through the filter unit to become a feed of filtered content. The feed at this stage may contain content that the user 105 may be interested in based on the key word, key word combinations, and/or unique company identifiers that are used in the filter unit 122.

The re-post identifying unit 124 may be responsible for analyzing and identifying a stream of user content or the stream of posts and re-posts 110 that have been filtered by the filtering unit 122. In one embodiment, the re-post identifying unit 124 may identify whether a certain user content is a post or a re-post. This can be identified based on the content of the message. Certain words or syntax in the message body, such as RT (Retweet), via, HT (heard through), MRT (modified Retweet), OH (overheard), PRT (partial Retweet) and other key words, can be used to determine if the message is a re-post of another message. If the re-post identifying unit 124 identifies that the message content is not a re-post, the re-post identifying unit 124 can ignore or discard the message in the user content for the purposes of this example. Content which are identified to be re-posts can be passed through to the re-post tracking unit 126.

In an embodiment, the re-post tracking unit 126 can communicate with the data store 130 to analyze, identify and determine if a re-post is one that is currently being tracked for public sentiment analysis. As used herein, the term "data store" refers to a repository for containing and storing data. The data that is stored in data store 130 may be related to tracking and storing a record of re-post content, which can include a time stamp that reflects the corresponding date and time that the content was re-posted, a re-post count, and any other information that may be relevant to that re-post. As used herein, a time stamp is a sequence of characters or encoded information identifying when a certain event occurred, including the date and time of day, accurate to a fraction of a second. If a re-post is not in the data store 130 for tracking, for example, if the re-post is a new content, then re-post tracking unit 126 can insert the re-post into the data store 130, along with the re-post date and time and any other information deemed useful.

If the re-post tracking unit 126 identifies that the re-post is already in the data store 130, the public sentiment determining unit 128 can compare the time stamp of the original post to the time stamp of the re-post. If the time difference is within a time threshold or a time interval, a count corresponding to the time threshold or time interval can be incremented. For instance, if an original post has a time stamp of 10:00:00, two thresholds or time intervals may be generated to track re-posts. For example, if each threshold or time interval is 5 minutes, then two re-post intervals can be created for the time periods of 10:00:00-10:04:59 (e.g., a first time interval) and 10:05:00-10:09:59 (e.g., a second time interval).

In an embodiment, the beginning time of each time interval can coincide with the time stamp of the original post. For example, if the time stamp of the original post is 10:03:52, then the first time interval can run from 10:03:52 thru 10:08:51 and the second time interval can run from 10:08:52 thru 10:13:51.

In another embodiment, the time intervals can be of varying sizes and do not need to be contiguous. For example, if the time stamp of the original post is 02:05:15, then the first time interval can run from 02:05:15 thru 03:05:14 and the second time interval can run from 08:05:15 thru 11:05:14. In this example, different rates can be captures for different types of users. For instance, the first interval can be targeted for the users who may constantly be monitoring the social media platform and may have a tendency to respond quickly with a re-post to a post, while the second interval can be targeted for the users who may periodically monitor the social media platform and may not be as responsive with a re-post to a post.

The public sentiment determining unit 128 can analyze additional re-posts and their corresponding time stamps and increment count in the respective time intervals based on the respective time stamp. For instance, if a re-post has a time stamp of 10:03:00, and the content of the re-post matches the content of an existing post or re-post that may be stored in the data store 130, the time stamp of 10:03:00 can be compared against the two established time intervals. In this example, the time stamp falls within the first time interval, 10:00:00-10:04:59, so the count that is associated with this time interval is incremented. Thus, the public sentiment determining unit 128 can maintain a count of re-posts based on their time stamps respective to the time stamp of the original post.

In one embodiment, if the time stamp of the re-post does not fall within one of the established time intervals, e.g., if the time stamp is after the latest interval, then the public sentiment determining unit 128 can discard or ignore the re-post. In another embodiment, if the time stamp of the re-post does not fall within one of the established time intervals, (e.g., if the time stamp is after the expiration of the latest interval), then the public sentiment determining unit 128 can create an additional time interval inclusive of the time stamp for further analysis.

Figure 2:
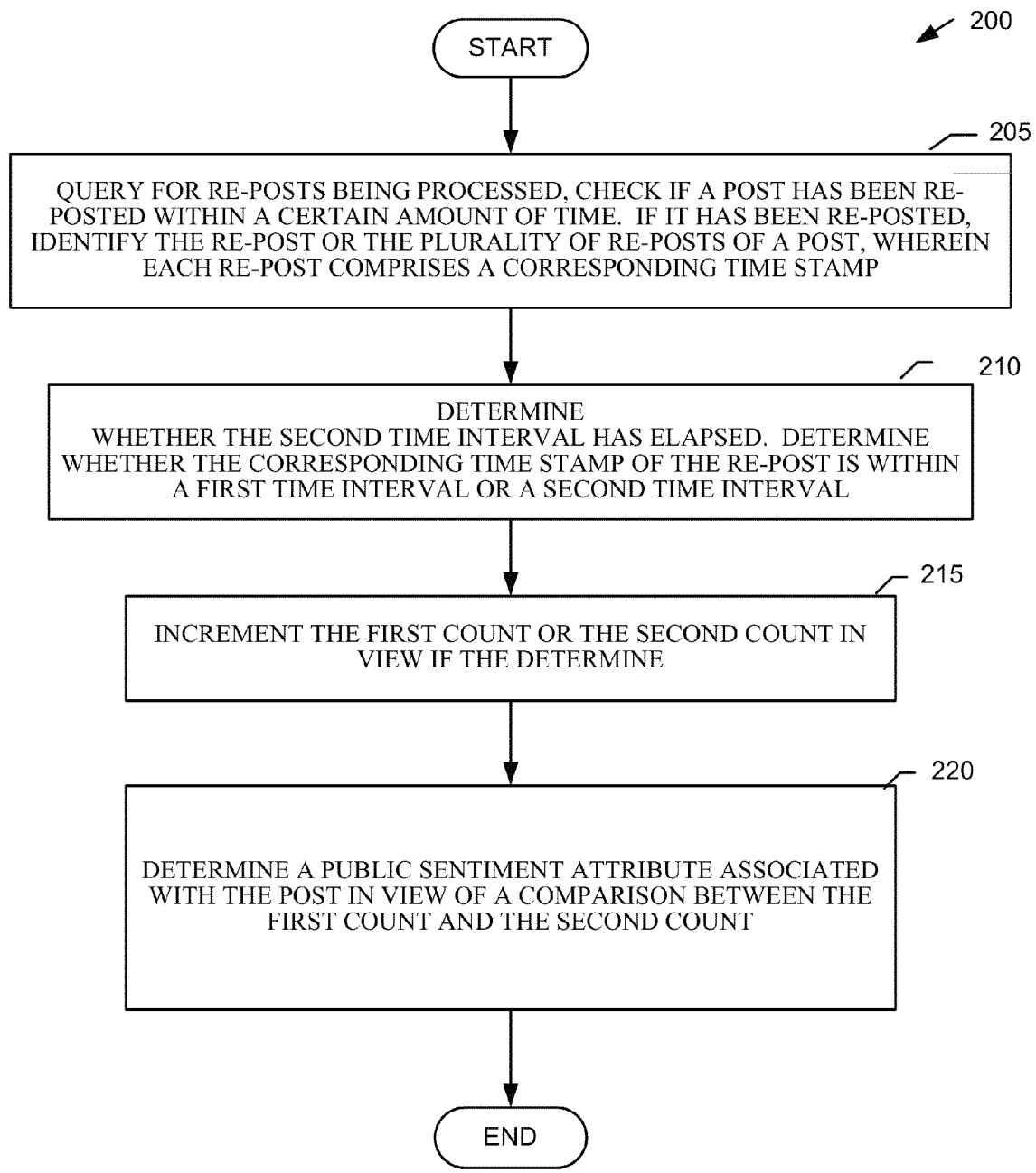
FIG. 2 is a flow diagram illustrating one embodiment of a method for tracking and determining a public sentiment attribute relating to a social media post.

FIG. 2 illustrates a flow diagram of one embodiment of a method for tracking and determining a public sentiment attribute relating to a social media post. At Block 205, the data store 130 can be queried for re-posts that are currently being tracked. This query may include, but is not limited to, selecting re-post records in the data store 130 based on a time stamp of a re-post. In an embodiment, the re-post records that have a time interval which have elapsed or expired within a threshold from the time of a current re-post can be queried. For instance, even though the re-post records in which the second, third, or any number of time intervals may have elapsed or expired within a certain amount of time (e.g., within 1 second, within 1 minute, within 1 hour, etc.) relative to the time stamp of the current re-post, the re-post records can still be queried. It can be envisioned that any number of time intervals may be used for selecting records based on a number of criteria, resulting in a number of re-post records to be used for comparison.

In an embodiment, the most recent time intervals which have expired can be compared based on the current time stamp. For instance, a re-post record may be determined to have three time intervals, for example, 10:00:00-10:04:59, 10:05:00-10:09:59, and 10:10:00-10:14:59. If the time stamp of the current re-post is 10:10:01, the determining system 120 can compare the first and second time intervals, based on the second time interval just expiring. If the time stamp of the current re-post is 10:15:01, the determining system 120 can compare the second and third intervals. In another embodiment, the determining system 120 can analyze all intervals prior to the most recently expired interval. For instance, based on the intervals described above, if the time stamp of the current re-post is 10:15:01, the determining system 120 may include all 3 expired columns for analysis.

At Block 210, the time intervals can be checked to determine whether or not the latest time interval has elapsed. If the latest time interval has elapsed, a new time interval can be created to include the time stamp of the re-post. If the latest time interval has not elapsed, a determination can be made as to whether the time stamp of the re-post is within the first time interval or the second time interval. In an embodiment, the re-post count of the most recently elapsed or expired time interval can be compared to the re-post count of the previous time interval. At block 215, a count of the first time interval or a count of the second time interval can be incremented in view of the determination of whether the time stamp of the re-post is within the first time interval or the second time interval.

At Block 220, a public sentiment attribute associated with the post or re-post in view of a comparison between the count of the first time interval and the count of the second time interval can be determined. For example, if the re-post count associated with the second time interval is greater than the re-post count associated with the first time interval, a public sentiment attribute can be determined to be, for example, "growing" to indicate a growing public sentiment with respect to the original post. If the re-post count associated with the second time interval is less than the re-post count associated with the first time interval, a public sentiment attribute can be determined to be, for example, "diminishing" or "not growing" with respect to the original post. In another embodiment, a threshold can be used to determine whether to publish, or to send a message comprising the public sentiment attribute or classification to a user associated with the original post.

In an embodiment, the time intervals can be checked to determine whether or not the latest time interval has elapsed as a stand-alone process. In other words, the time intervals can be checked and the count of the first time interval and the count of the second time interval can be compared in the absence of an arrival of a re-post. In an embodiment, this check and comparison can be performed on a scheduled basis. For example, the check for an expired time interval and the interval count comparison can be executed periodically (e.g., every 1 second, every minute, every 10 minutes, every hour, etc.). In an embodiment, the check for the expired time interval and the interval count comparison can be triggered via a scheduler process such as a cron or a time-based job scheduler or other task scheduler. In an embodiment, the periodic check and comparison can be executed by a process running on a loop with an interval for executing the check and comparison.

In an embodiment, the public sentiment attribute or classification of the post can be qualified by a percent increase. For instance, increase percentage threshold of 100% can be assigned as a threshold. For example, if the count of re-posts in the first time interval is 10, the re-post would only publish if the count of re-posts has increased by 100% or more for the next time interval, or 20 re-posts in the second time interval. For this example, if the second time interval only has 18 re-posts, re-post would not be published to the user, despite the increase in re-posts from the first time interval to the second time interval.

In another embodiment, a numeric threshold may be configured for the second count being compared. For instance, the re-post count in either the first or the second time interval (or both) may be required to be greater than a predetermined count, such as 10,000 re-posts, otherwise the public sentiment attribute is not deemed interesting nor worth publishing.

In another embodiment, the re-post counts of multiple time intervals may be compared to determine if a re-post should be published. For instance, the difference in re-post count from interval 1 to interval 2 may be compared to the difference from interval 2 to interval 3. In one embodiment, if the second difference from interval 2 to 3 is greater than the first difference from interval 1 to 2, it can be determined that interest in the re-post is continuing to grow over multiple intervals and the re-post can be published.

In another embodiment, a threshold may be used for analyzing 3 or more time intervals. The comparisons of interval differences may be used as described above, with the added requirement that the second difference may need to be a certain percentage higher than the first difference. For instance, the re-post count for the second interval may need to be at least 50% greater than the re-post count for the first interval to determine continued increasing interest in the post. In another embodiment, a numeric threshold may be used to determine a public sentiment attribute of "increasing interest", such as if the second difference increased by at least 5,000 re-posts over the first difference.

In another embodiment using multiple interval differences, slight decrease in re-posts from the first to second time intervals may be allowed without affecting the public sentiment attribute. This decrease may be based on a percentage of the first time interval or based on a numeric value. For instance, where the decrease threshold is 10%, and the first interval is 100,000, the process may allow a second interval greater than 90,000 to still be deemed to have a public sentiment attribute of "interesting" and therefore worthy of publication.

After a re-post is determined to have a public sentiment attribute of "interesting" and worthy of publication, the re-post may be published using any number of formats, such as, but not limited to text, XML HTML and may be delivered to an end user or other recipient via any number of technologies, such as, but not limited to TCP feed, FTP, HTTP Web pages, or any other hosted solution or direct feed. Published content may also be forwarded to another system for further processing or analysis. In an embodiment, the above described method, or portion thereof, may be referred to as the Velocity Of Re-post Expansion, or VORTEX.

FIG. 3 is an example of a data table 300 illustrating one embodiment of a method for tracking and determining a public sentiment attribute relating to a social media post. The data table 300 can be stored, for example, in data store 130 of the determining system 120. The example data table 300 includes a header section 302, and 5 different examples of content analysis 304, 306, 308, 310, and 312, respectively.

The header section 302 includes six columns of data. The first column of data, post ID, are unique identifiers of different posts. The post content (column 2) includes certain key words, combination of key words and/or unique identifiers (e.g., a company identifier) that are present in the respective post ID. The post content can be used by the filter unit 122, as discussed above, to filter incoming content (stream of posts and re-posts 110) using string matching techniques. The initial post time (column 3) is the date and time of the original post. The interval 1 count and interval 2 count (columns 4 and 5, respectively) reflect the number of re-posts in each respective time interval. The classification (column 6) can be the determined public sentiment attribute for each post ID.

For example, post ID 0 includes the key words "Company A" and "invent". Since the number of re-posts in interval 2 is greater than that of interval 1, this post can be classified with a public sentiment attribute as "growing".

Regarding post ID 1, which includes the key words "Brand B" and "computer", the number of re-posts in interval 2 is less than that of interval 1. Hence, this post can be classified with a public sentiment attribute as "not interesting". For post ID 2, having the key words "Brand C" and "automobile", the number of re-posts in interval 2 is more than 100% than that of interval 1. Hence this post can be classified with a public sentiment attribute as "substantially growing".

With respect to post ID 3, which includes the key words "Company D" and "IPO", the number of re-posts in interval 2 is less than that of interval 1. However, since each count exceeds a threshold, this post can be classified with a public sentiment attribute as "high interest". For post ID 4, having the key words "Company E" and "Bankrupt", the number of re-posts in interval 2 is less than that of interval 1. Hence, this post can be classified with a public sentiment attribute as "not interesting".

It is understood that the scientific data can be leveraged as a notification system, a publishing system, or other analytics based on either the re-post expansion phenomena or the information contained in the initial tweet since the information is now held to a greater standard as proven by the disclosure presented. Other information that can be published based on this disclosure and these findings can include, but are not limited to, the rate of growth of a post or re-post, the number of re-posts in a time interval, the original user and their influence on the Retweet expansion, or other useful metadata information.

The components and other features described herein may be implemented as discrete hardware components or integrated in the functionality of hardware components such as ASICs, FPGAs, DSPs or similar devices. In addition, these components may be implemented as firmware or functional circuitry within hardware devices. Further, these components may be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Figure 4:
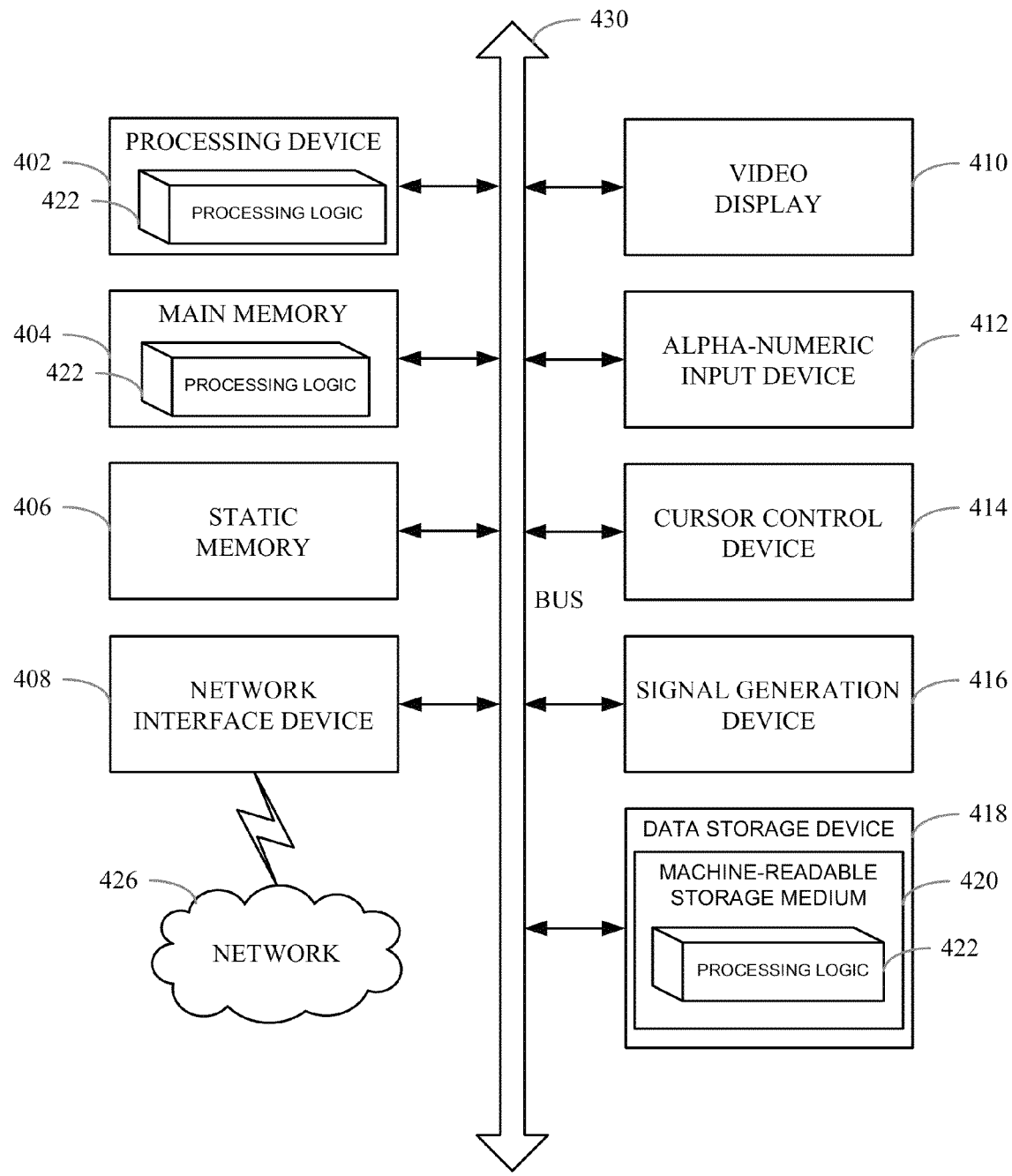
FIG. 4 illustrates a diagrammatic representation of a machine in the exemplary form of a computer system within which a set of instructions or processing logic may be executed for causing the machine to perform any one or more of the methodologies discussed herein.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute processing logic 422 for determining public sentiment for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., processing logic 422) embodying any one or more of the methodologies of functions described herein. Processing logic 422 may also reside, completely or at least partially, within main memory 404 and/or within processing device 402 during execution thereof by computer system 400; main memory 404 and processing device 402 also constituting machine-readable storage media. Content processing logic 422 may further be transmitted or received over a network 426 via network interface device 408.

Machine-readable storage medium 420 may also be used to store the post and re-post analysis of the determining system 120. While machine-readable storage medium 420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not be limited to, solid-state memories, and optical and magnetic media.

The components and other features described herein may be implemented as discrete hardware components or integrated in the functionality of hardware components such as ASICs, FPGAs, DSPs or similar devices. In addition, these components may be implemented as firmware or functional circuitry within hardware devices. Further, these components may be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "identifying", "determining", "incrementing", "associating", "sending", "classifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

Although specific embodiments have been illustrated and described herein, those of ordinary skill in the art will appreciate that an arrangement configured to achieve the same results may be substituted for the specific embodiments shown. This description is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description.

What is claimed is:

1. A method comprising:
    identifying, by a processing device, a plurality of re-posts of a post, wherein each re-post comprises a time stamp;
    determining, by the processing device, whether the time stamp of the re-post is within a first time interval or a second time interval;
    incrementing, by the processing device, a first count associated with the first time interval when the time stamp is within the first time interval or a second count associated with the second time interval when the time stamp is within the second time interval;
    determining, by the processing device, a public sentiment attribute associated with the post in view of a comparison between the first count associated with the first time interval and the second count associated with the second time interval; and
    transmitting, by the processing device, to a user interface of a computer processor, a message comprising the public sentiment attribute to provide a user with a measure of an expansion rate of the post in view of the comparison.

2. The method of claim 1, wherein the first time interval and the second time interval are equal and consecutive time intervals.

3. The method of claim 1, wherein the public sentiment attribute is a growing public sentiment when the second count exceeds the first count.

4. The method of claim 1, wherein the public sentiment attribute is a growing public sentiment when the second count exceeds the first count by a predetermined percentage.

5. The method of claim 1, wherein the public sentiment attribute is a high public sentiment when the first count is greater than or equal to the second count and each of the first count and the second count exceeds a predetermined threshold.

6. The method of claim 1, wherein a beginning time of the first time interval coincides with a time stamp of the post.

7. A system comprising:
    a memory; and
    a processing device communicably coupled to the memory, the processing device to:
        identify a plurality of re-posts of a post, wherein each re-post comprises a time stamp;
        determine whether the time stamp of the re-post is within a first time interval or a second time interval;
        increment a first count associated with the first time interval when the time stamp is within the first time interval or a second count associated with the second time interval when the time stamp is within the second time interval;

determine a public sentiment attribute associated with the post in view of a comparison between the first count associated with the first time interval and the second count associated with the second time interval; and transmit to a user interface of a computer processor a message comprising the public sentiment attribute to provide a user with a measure of an expansion rate of the post in view of the comparison.

8. The system of claim 7, wherein the first time interval and the second time interval are equal and consecutive time intervals.

9. The system of claim 7, wherein the public sentiment attribute is a growing public sentiment when the second count exceeds the first count.

10. The system of claim 7, wherein the public sentiment attribute is a growing public sentiment when the second count exceeds the first count by a predetermined percentage.

11. The system of claim 7, wherein the public sentiment attribute is a high public sentiment when the first count is greater than or equal to the second count and each of the first count and the second count exceeds a predetermined threshold.

12. The system of claim 7, wherein a beginning time of the first time interval coincides with a time stamp of the post.

13. A non-transitory computer readable storage device including instructions that, when executed by a processing device, cause the processing device to execute operations comprising:

identifying, by a processing device, a plurality of re-posts of a post, wherein each re-post comprises a time stamp;

determining, by the processing device, whether the time stamp of the re-post is within a first time interval or a second time interval;

incrementing, by the processing device, a first count associated with the first time interval when the time stamp is within the first time interval or a second count associated with the second time interval when the time stamp is within the second time interval;

determining, by the processing device, a public sentiment attribute associated with the post in view of a comparison between the first count associated with the first time interval and the second count associated with the second time interval; and transmitting, by the processing device, to a user interface of a computer processor, a message comprising the public sentiment attribute to provide a user with a measure of an expansion rate of the post in view of the comparison.

14. The non-transitory computer readable storage device of claim 13, wherein the first time interval and the second time interval are equal and consecutive time intervals.

15. The non-transitory computer readable storage device of claim 13, wherein the public sentiment attribute is a growing public sentiment when the second count exceeds the first count.

16. The non-transitory computer readable storage device of claim 13, wherein the public sentiment attribute is a growing public sentiment when the second count exceeds the first count by a predetermined percentage.

17. The non-transitory computer readable storage device of claim 13, wherein the public sentiment attribute is a high public sentiment when the first count is greater than or equal to the second count and each of the first count and the second count exceeds a predetermined threshold.

* * * * *